(12) United States Patent
Petrov

(10) Patent No.: US 8,602,349 B2
(45) Date of Patent: Dec. 10, 2013

(54) AIRBORNE, TETHERED, REMOTELY STABILIZED SURVEILLANCE PLATFORM

(76) Inventor: Dimitri Petrov, Montreal (CA)

( * ) Notice: Subject to any disclaimer, the term of this patent is extended or adjusted under 35 U.S.C. 154(b) by 0 days.

(21) Appl. No.: 12/803,254

(22) Filed: Jun. 23, 2010

(65) Prior Publication Data
US 2011/0315810 A1 Dec. 29, 2011

(51) Int. Cl.
*B64C 27/10* (2006.01)
(52) U.S. Cl.
USPC .............. 244/17.23; 244/23 C; 244/190
(58) Field of Classification Search
USPC ........... 244/17.23, 23 A, 23 C, 33, 190, 17.17
See application file for complete search history.

(56) References Cited

U.S. PATENT DOCUMENTS

| | | | | | |
|---|---|---|---|---|---|
| 2,948,489 | A | * | 8/1960 | Miller, Jr. et al. | 244/17.17 |
| 3,148,847 | A | * | 9/1964 | Manificat | 244/17.17 |
| 3,149,803 | A | * | 9/1964 | Petrides et al. | 244/17.13 |
| 4,934,629 | A | * | 6/1990 | Brant | 244/2 |
| 6,450,445 | B1 | * | 9/2002 | Moller | 244/23 A |

* cited by examiner

Primary Examiner — Rob Swiatek

(57) ABSTRACT

An airborne surveillance platform supporting optoelectronic and electronic sensors, including level sensors, is automatically stabilized in a horizontal plane by varying the length of two tethers out of three. Error signals from the level sensors are transmitted over a wireless link to control components on a rotating platform on the host vehicle, which automatically vary the length of tethers. Applications include images of the surrounding terrain generated by a video camera and a thermal imager in military, police and civil emergency operations.

6 Claims, 4 Drawing Sheets

AIRBORNE, TETHERED, REMOTELY STABILIZED SURVEILLANCE PLATFORM

CROSS-REFERENCE TO RELATED APPLICATIONS

This application claims the benefit of provisional patent application Ser. No. 61/269,000 filed on 19 Jun. 2009, by the present inventor.

FEDERALLY SPONSORED RESEARCH

Not applicable

SEQUENCE LISTING

Not applicable

BACKGROUND

1. Field

This application relates to airborne surveillance platforms.

2. Prior Art

There is a need for airborne platforms supporting electronic and optoelectronic sensors for gathering meteorological data and for transmitting images of the surrounding terrain in military, police and civil emergency applications Crosby describes in U.S. Pat. No. 2,433,344 an aeronautic positioning device that automatically stabilizes a balloon, and airplane or a helicopter in a desired position above the earth, irrespective of wind and atmospheric conditions. The aerial vehicle supports a radio antenna of meteorological equipment. However, the positioning device is not suitable for maintaining a surveillance platform in a horizontal position since it relies solely on the aerodynamics of the supporting vehicle to meet this requirement. In order to ensure the stability of the image transmitted from a video camera or a thermal imager mounted on a platform, the latter has to remain horizontal or inclined at a fixed angle with respect to the horizontal plane.

Peterson teaches in U.S. Pat. No. 5,115,997 how an aerodynamic device helps to maintain a surveillance balloon elevation when exposed to high-velocity winds. The balloon is equipped with stabilizing fins and therefore always faces the prevailing wind. It supports a sensor pod containing a video camera and a thermal imager, as well as an azimuth actuator that allows a limited scan about the lubber line of the balloon. Consequently; the observation sensors cannot provide a full-circle view of the surrounding terrain. Furthermore, the sensor suite lacks a vertical control loop that would ensure a stable image to the operator.

An existing 4.9 m long surveillance balloon supports a 2-axis (pitch and roll), 3-gimbal gyro-stabilized platform equipped with a video camera and a thermal imager. The absence of yaw control precludes a full-circle scan of the surrounding terrain. It has also the disadvantage of being visible from afar and failing to operate in winds over 50 mph. It requires three technicians for its deployment and retrieval, and two for its operation. An advanced version of this surveillance system has a 3-axis (pitch, roll and yaw), 3-gimbal gyro-stabilized platform that ensures a full-circle observation capability. However, it has to be supported by a 15.6 m long balloon that requires three technicians for its deployment, operation and retrieval, and a large flat-bed trailer for transport.

Air surveillance and reconnaissance can also be accomplished by unmanned aerial vehicles (UAVs). A typical existing fixed-wing UAV has a wing span of 4.2 m and is powered by an electric motor. It is equipped with a gyro-stabilized platform that supports a video camera and a thermal imager. The UAV is launched from an all-terrain vehicle and is operated and recovered by two technicians. Piloting skills are required for controlling its flight and landing. Several man-portable rotary-wing and ducted-fan UAVs are being developed. Their main disadvantage is their tendency to drift and become unstable in crosswinds.

Surveillance from a high vantage point can also be achieved by mounting a video camera, a thermal imager and radar on a mast. Such an installation is presently used on a light armor reconnaissance vehicle (LAV-RECCE) that supports a 10-m telescoping mast. This surveillance system has the tactical disadvantage of operating only when the vehicle is stationary.

SUMMARY in accordance with one embodiment, a platform attached to a vertical takeoff UAV, supports on its upper part optoelectronic and electronic sensors, including two level sensors mounted at an angle. Three tethers are attached to its underside at three points that form a triangle. The altitude of the platform is determined by the predetermined length of one tether, paid out by a reel connected to a variable friction clutch attached to an electric motor. At the predetermined altitude, the platform is stabilized in the horizontal plane by automatically adjusting the lengths of the two remaining tethers, until the outputs from the two level sensors are minimized. This is achieved by means of one servo-loop for each tether, comprising a level sensor acting as an error detector and a wireless link in the feedback loop that transmits the error signal to an amplifier driving a servomotor connected to a reel that controls the tether length. Consequently, the platform is remotely stabilized by reels, clutches, servomotors, amplifiers and wireless receivers mounted on a rotating platform on a host vehicle or a ground station.

DRAWINGS

Figures

The figures accompanying this disclosure are summarized as follows.

DETAILED DESCRIPTION OF THE PREFERRED EMBODIMENT

Figure 1:
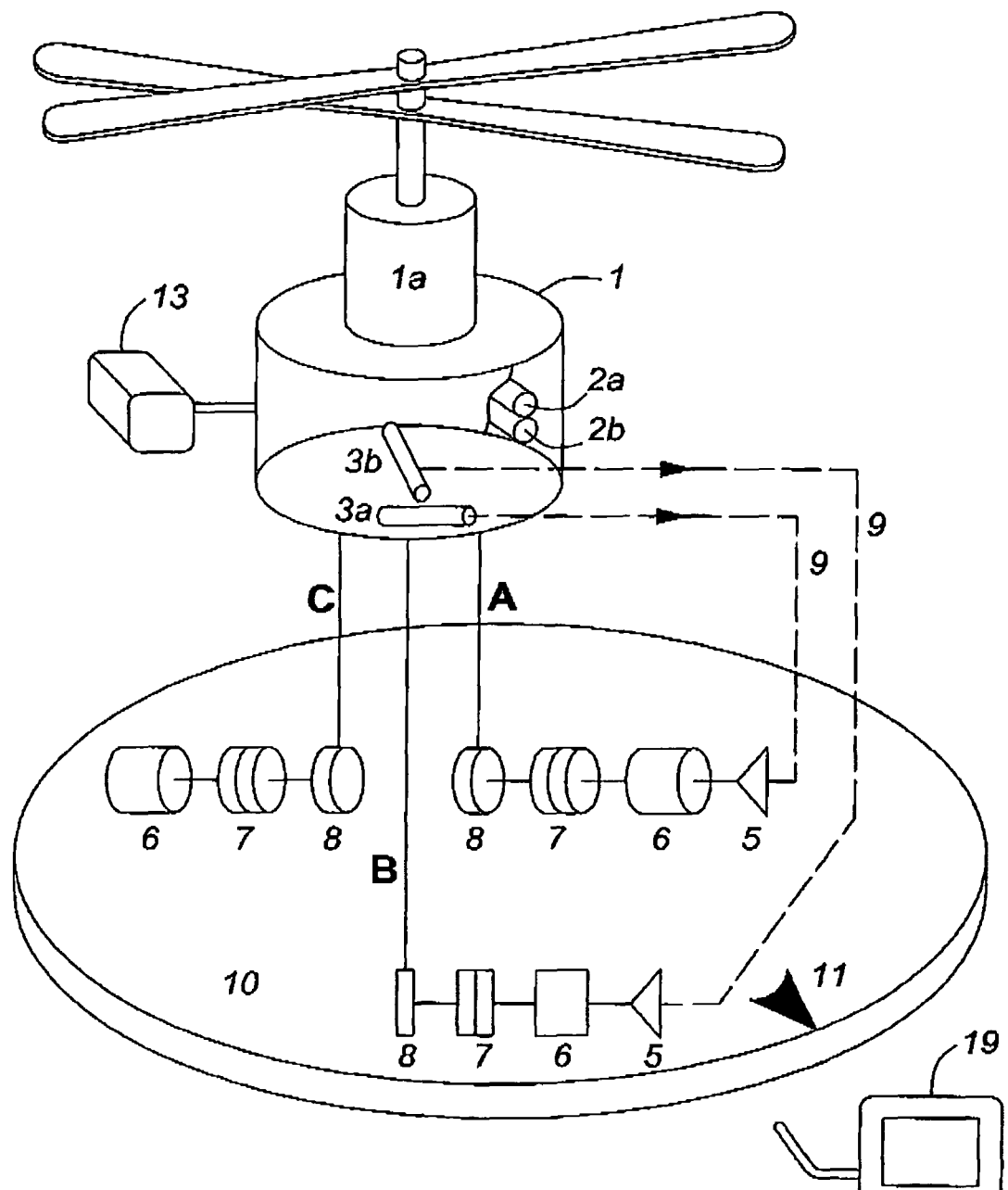
FIG. 1 is a functional schematic of an airborne, tethered, remotely stabilized surveillance platform.

The functional schematic of airborne surveillance platform 1 is illustrated in FIG. 1. Two counter-rotating propellers are driven by electric motor 1a, which receives the required energy from an on-board battery or from a power supply in the vehicle via the conductive tethers. With clutches 7 disengaged, three tethers A, B and C are paid out by reels 8 until the platform reaches an altitude determined by the length of tether C. The reel drives are 120° degrees apart. At this stage, all three clutches 7 are engaged and the tethers are under tension. While the length of tether C remains fixed, the lengths of tethers A and B are adjusted by means of two positional servo-loops as follows. First, the error signal from level sensor 3a is transmitted over wireless link 9 to amplifier 5 which drives motor 6 and reel 8, until the length of tether A is adjusted so that the error signal is minimized and level sensor 3a is horizontal. This sequence of events is then repeated by the servo-loop controlling the length of tether B and ensuring that the output from level sensor 3b is minimized. The platform is then horizontal, so that video camera 2a and thermal imager 2b, inclined at a fixed angle with respect to the platform, can scrutinize the ground ahead of the vehicle, as the altitude of the surveillance platform is varied by shortening or lengthening tether C. The outputs from video camera 2a and thermal imager 2b are transmitted over wireless link 9 to control and display unit 19 in the vehicle. The duration of the leveling operation is estimated to be in the millisecond range.

An alternate surveillance operation consists in keeping level sensor 3a horizontal and varying the tilt of level sensor 3b in known increments transmitted over wireless link 9 and presented on display 19, by adjusting the length of tether B, while maintaining the altitude of the platform constant. This method ensures a linear scan of the terrain ahead of the vehicle. Concurrently, the magnetic heading of the platform determined by magnetic compass 13 is also transmitted over the wireless link and presented on display 19 in the vehicle. After completing its mission, the surveillance platform is winched down and stored in its container on the host vehicle. During this operation, the lift of the rotors maintains the three tethers under tension.

All altitude and attitude controls for the airborne reconnaissance vehicle are mounted on rotating platform 10 bearing index mark 11, allowing measurement of the angle with respect to the lubber line of the host vehicle. Platform 10 can be rotated either manually or by an electrical drive.

Figure 2:
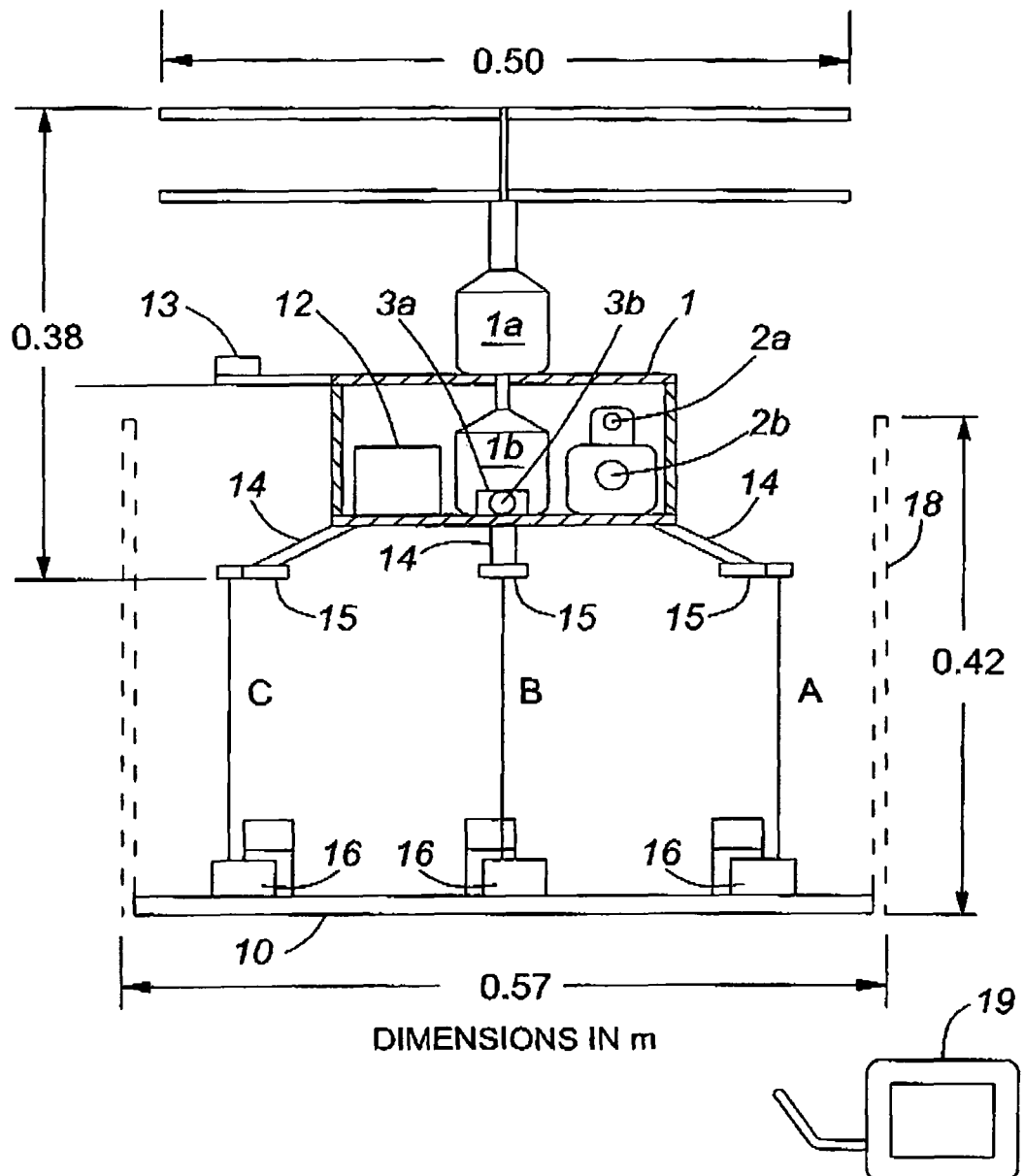
FIG. 2 is a configuration schematic of the airborne, tethered, remotely stabilized surveillance platform.

The configuration schematic of the airborne surveillance platform 1, which illustrates its main components and approximate dimensions, is shown in FIG. 2. Two 0.5-m rotors are driven by coaxial electric motors 1a and 1b. Their total mass is 1.05 kg and their power output is 3.2 kW. An alternate propulsion system could be one 4.0-kW electrical motor or a 3.1-kW four-stroke rotating cylinder valve engine driving a coaxial gear head. Video camera 2a is mounted on top of thermal imager 2b and their optical axes are parallel. Level sensor 3b, aligned with the lubber line of the platform, is perpendicular to level sensor 3a. Electronic unit 12 contains a wireless transmitter connected to level sensors 3a and 3b, video camera 2a, thermal imager 2b and an interface with the conducting tethers or Lithium-Polymer (Li-Po) batteries. Digital magnetic compass 13 connected to the wireless transmitter is placed on a support remotely from the motors. The surveillance platform is supported by three radial support legs 14, 120° apart, attached to tethers A, B and C. Each leg is equipped with a rare earth magnet 15 in a steel cup. As the platform is pulled down by winch drives 16 installed on rotating platform 10, magnets 15 lock onto electromagnets 17 of opposite polarity. Each winch drive 16 includes a reel, an electric clutch and a servomotor. Winch drives 16 controlling the lengths of tethers A and B also include a wireless receiver and an amplifier. The platform is now safely stored for transport in container 18 (no lid is shown). To start a surveillance mission, the motors are turned on and the polarity of electromagnets 17 is reversed thereby unlocking support legs 14. The platform is leveled when it reaches the predetermined altitude, the signals from video camera 2a, thermal imager 2b and digital compass 13 are transmitted and presented in the vehicle on control and display unit 19 that includes a wireless receiver and a video screen. The system operation, including control of altitude, angular position of rotating platform 10 with respect to the host vehicle lubber line, is managed by control and display unit 19.

Figure 3:
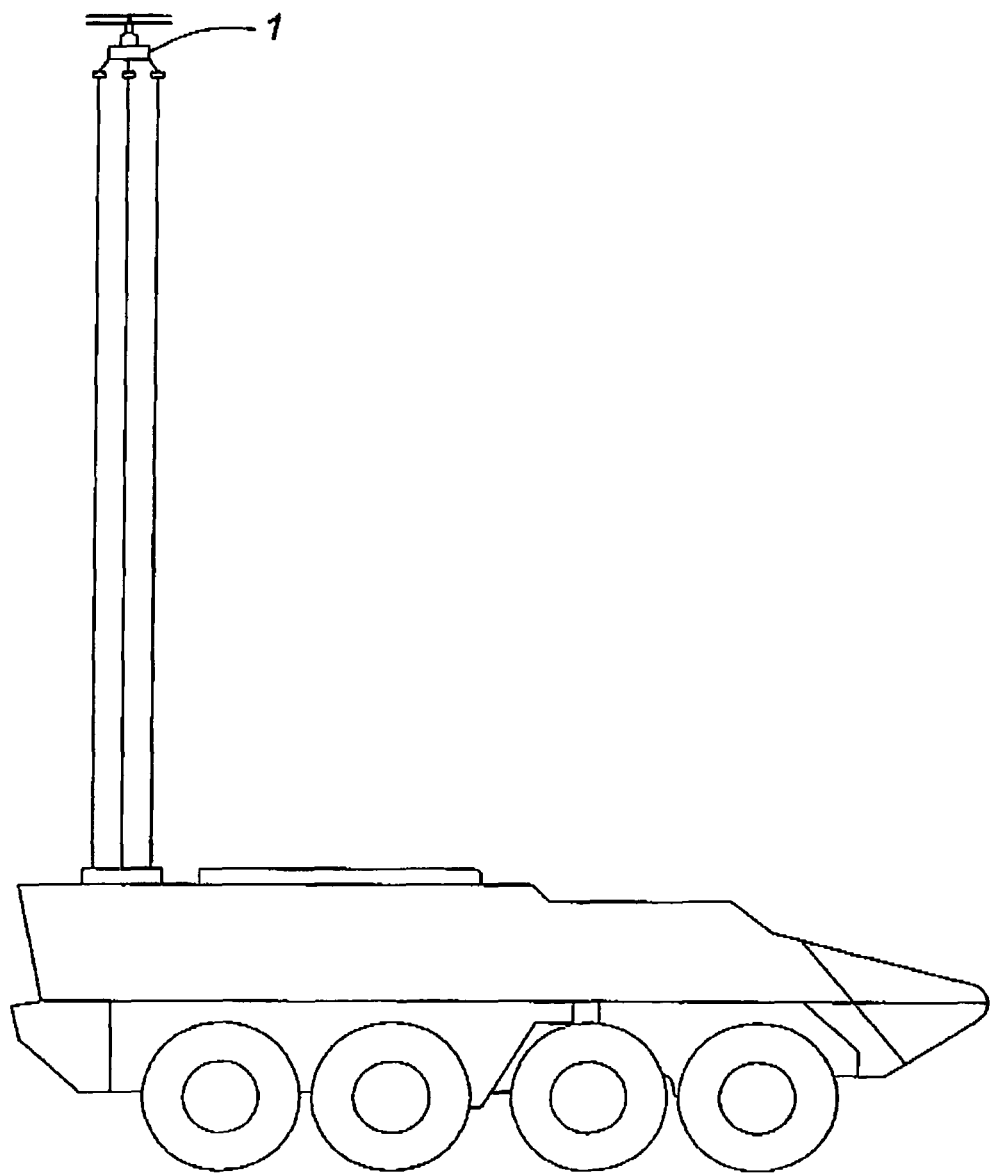
FIG. 3 shows the tethered surveillance platform approximately 7 m above a stationary light armored vehicle (LAV), in fair-weather conditions.

FIG. 3 shows the surveillance platform 1 tethered to a stationary LAV, at an altitude of about 7 m above the vehicle, in fair-weather conditions. In this case the tethers are close to being vertical.

Figure 4:
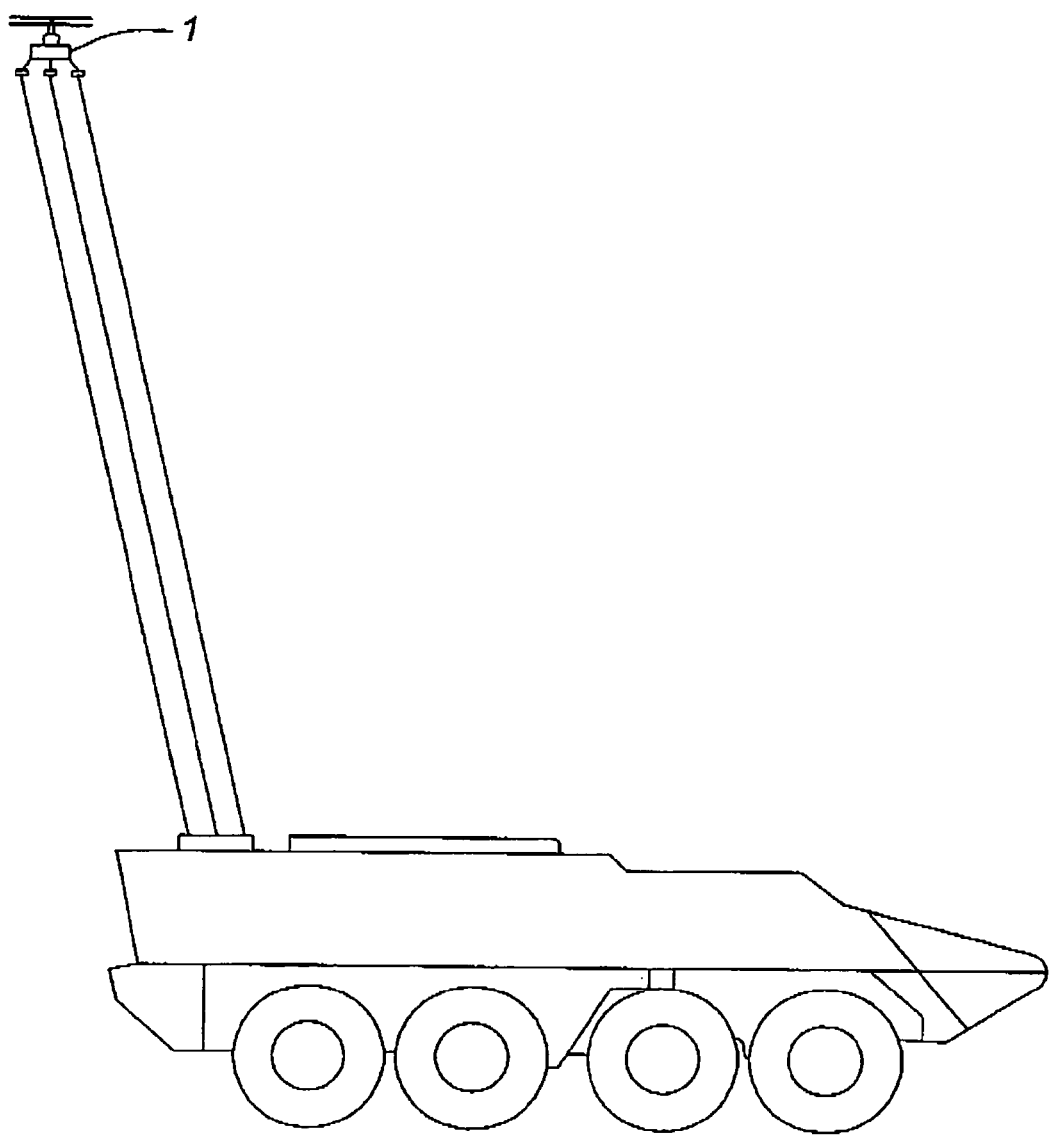
FIG. 4 illustrates the tethered surveillance platform approximately 7 m above a moving LAV.

FIG. 4 illustrates surveillance platform 1 tethered to a moving LAV, at an altitude of about 7 m. In this case the tethers are deflected from the vertical by crosswinds. Nevertheless, the remote stabilization system continues to function as previously described and maintains platform 1 in a horizontal position. Three operational characteristics contribute to the stability of the platform in the horizontal plane under these conditions: high degree of immunity of two counter-rotating rotors to crosswinds, torsional stiffness of three tethers 120° apart under tension and continuous operation of the two fast-response stabilizing servo-loops.

From the above description the following advantages of the airborne, tethered, remotely stabilized surveillance platform become evident:
  a) It gives a vehicle commander a bird's eye view of the surrounding terrain.
  b) System operation is simple. Images from the video camera and the thermal imager, the magnetic heading of the surveillance platform, the angle between the rotating platform and the vehicle lubber line are displayed on a monitor video screen.
  c) It can be installed on any vehicle or ground station and can be deployed and retrieved in seconds by one operator.
  d) All components required for stabilization are located on the host vehicle and powered by its electrical system.
  e) Energy to the electrical motor(s) is transmitted via the conductive tethers.
  f) The system can be used in military and police operations, such as inspecting the inside of a building through a window or directing traffic, at a much lower cost than using a helicopter.

CONCLUSION

The foregoing has constituted a description of specific embodiments showing how the invention may be applied and put to use. These embodiments are only exemplary. The invention in its broadest and more specific aspects is further described and defined in the claims, which now follow.

These claims, and the language used therein, are to be understood in terms of the variants of the invention, which have been described. They are not to be restricted to such variants, but are to be read as covering the full scope of the invention as is implicit in the invention and the disclosure that has been provided herein.

I claim:
1. A system for automatically stabilizing by remote control an airborne, tethered surveillance platform comprising:
  I. a vertical takeoff unmanned aerial vehicle including at least one electric motor for driving two counter-rotating propellers, thereby generating an upward lift,
  II. a surveillance platform comprising:
    a. a symmetrical platform fixed perpendicularly to the stator of said at least one electric motor, said symmetrical platform comprising:

b. a digital compass, a video camera and a thermal imager the optical axis thereof being parallel to the optical axis of said video camera,
c. first and second level sensors forming an angle in a plane parallel to said platform,
d. a wireless transmitter providing the means for transmitting the output signals from said digital compass, said video camera, said infrared viewer, said first level sensor and said second level sensor,
e. first, second and third support legs of equal length being radial with respect to the axis of said at least one electric motor, the extremities of the support legs being located at the apexes of a triangle in a plane parallel to said symmetrical platform,
f. first, second and third conductive tethers attached respectively to the extremities;

III. a host vehicle including a power supply that transmits electrical energy to said at least one electric motor over the conductive tethers;

IV. a symmetrical rotating platform mounted atop said host vehicle, the platform bearing an index mark allowing the measurement of its angle with respect to the lubber line of said host vehicle, said symmetrical rotating platform providing the means for storing the unmanned aerial vehicle and for controlling the altitude and attitude thereof comprising:
a. first, second and third radial winch drives, each of the winch drives including a servomotor for rotating a clutch connected to a reel on which one conductive tether is wound, the three reels being equidistant from the center of said symmetrical rotating platform and located at the apexes of a triangle having the same configuration, as the triangle defining the extremities of said support legs attached to said symmetrical platform fixed to the stator of the said at least one electric motor, so that the three conductive tethers remain under tension and close to parallel, as said unmanned aerial vehicle rises vertically from said symmetrical rotating platform,
b. said third winch drive providing the means for varying the length of the third tether thereby controlling a predetermined altitude to which said unmanned aerial vehicle and the attached surveillance platform will rise,
c. first and second amplifiers located in the first and second winch drives connected to respective servomotors,
d. first and second wireless receivers located in the first and second winch drives transmitting the signal outputs from the first and second level sensors to respectively first and second amplifiers driving respectively the servomotors in the first and second winch drives, whereby the lengths of the first and second conductive tethers are adjusted at the predetermined altitude until the signal outputs from the first and second level sensors are minimized and the airborne platform is automatically stabilized in a horizontal plane;

V. an electronic control and display unit installed in the host vehicle comprising:
a. a video screen,
b. a wireless receiver for receiving the output signals from the digital compass, the video camera and the infrared viewer, and electronic means for displaying said output signals on said video screen,
c. an electronic circuit for controlling an electromechanical drive mechanism for turning the rotating platform with respect to the lubber line of the host vehicle,
d. an electronic circuit for controlling the third winch drive and thereby the length of the paid out third conductive tether that provides the means for determining the altitude to which the unmanned aerial vehicle will rise, whereby the system for automatically stabilizing by remote control an airborne, tethered surveillance platform provides the means for controlling the altitude to which the surveillance platform will ascend, and adjusting the lengths of the two other tethers by means of two positional servo-loops, until achieving minimum error signals from two level sensors positioned at an angle on said symmetrical platform, thereby stabilizing said surveillance platform in a horizontal plane.

2. The system for automatically stabilizing by remote control an airborne tethered, surveillance platform as in claim 1, wherein said at least one electric motor is two coaxial electric motors.

3. The system for automatically stabilizing by remote control an airborne tethered, surveillance platform as in claim 1, including an electrical control mechanism for attaching the surveillance platform to the rotating platform and for generating an initial upward thrust to said surveillance platform during the vertical takeoff of the unmanned aerial vehicle comprising:
a. a steel cup containing a magnet located on the three support legs attached to the surveillance platform,
b. an electromagnet of reversible polarity fixated to the rotating platform close to each of the three reels on which one conductive tether is wound, whereby, depending on their predetermined polarity, the three electromagnets energized by the power supply of the host vehicle, either attract the three magnets in steel cups and provide the means for attaching the surveillance platform to the rotating platform, or repel the three magnets in steel cups and provide the means for imparting to the surveillance platform an initial upward thrust,
c. a switching circuit connected to the vehicle power supply, said switching circuit being located in the control and display unit providing the means for controlling the polarity of the three electromagnets.

4. The system for automatically stabilizing by remote control an airborne tethered, surveillance platform as in claim 1, wherein the three tethers are made of non-conductive material and a battery installed on the airborne platform provides energy to said at least one electric motor.

5. The system for automatically stabilizing by remote control an airborne tethered, surveillance platform as in claim 1, wherein the three tethers are made of non-conductive material and a battery installed on the surveillance platform provides energy to said at least one electric motor that is two coaxial electric motors.

6. A system for automatically stabilizing by remote control a tethered, airborne surveillance platform comprising:
I. a vertical takeoff unmanned aerial vehicle including at least one electric motor for driving two counter-rotating propellers thereby generating an upward lift,
II. a surveillance platform comprising:
a. a symmetrical platform fixed perpendicularly to the stator of said at least one electric motor, said symmetrical platform comprising:

b. a digital compass, a video camera and a thermal imager the optical axis thereof being parallel to the optical axis of said video camera,
c. first and second level sensors forming an angle in a plane parallel to said platform,
d. a wireless transmitter providing the means for transmitting the output signals from said digital compass, said video camera, said infrared viewer, said first level sensor and said second level sensor,
e. first, second and third support legs of equal length being radial with respect to the axis of said at least one electric motor, the extremities of the support legs being located at the apexes of a triangle in a plane parallel to said symmetrical platform,
f. first, second and third conductive tethers attached respectively to the extremities;

III. a ground station comprising a support structure of predetermined configuration, and a power supply that transmits electrical energy to said at least one electric motor over the conductive tethers;

IV. a symmetrical rotating platform mounted atop said support structure, the platform bearing an index mark allowing the measurement of its angle with respect to a position reference on the support structure, said symmetrical rotating platform providing the means for storing the unmanned aerial vehicle and for controlling the altitude and attitude thereof comprising:
a. first, second and third radial winch drives, each of the winch drives including a servomotor for rotating a clutch connected to a reel on which one conductive tether is wound, the three reels being equidistant from the center of said symmetrical rotating platform and located at the apexes of a triangle having the same configuration as the triangle defining the extremities of said support legs attached to said symmetrical platform fixed to the stator of said at least one electric motor, so that the three conductive tethers remain under tension and close to parallel, as said unmanned aerial vehicle rises vertically from said symmetrical rotating platform,
b. said third winch drive providing the means for varying the length of said third tether thereby controlling a predetermined altitude to which said unmanned aerial vehicle and the attached airborne platform will rise,
c. first and second amplifiers located in the first and second winch drives connected to respective servomotors,
d. first and second wireless receivers located in first and second winch drives transmitting the signal outputs from the first and second level sensors to respectively first and second amplifiers driving respectively the servomotors in the first and second winch drives, whereby the lengths of the first and second conductive tethers are adjusted at the predetermined altitude until said signal outputs from the first and second level sensors are minimized and the airborne platform is automatically stabilized in a horizontal plane;

V. an electronic control and display unit installed in the host vehicle comprising:
a. a video screen,
b. a wireless receiver for receiving the output signals from the digital compass, the video camera and the infrared viewer, and electronic means for displaying said output signals on said video screen,
c. an electronic circuit for controlling an electromechanical drive mechanism for turning the rotating platform with respect to the support structure,
d. an electronic circuit for controlling the third winch drive and thereby the length of the paid out third conductive tether that provides the means for determining the altitude to which the unmanned aerial vehicle will rise.

* * * * *